United States Patent Office 3,591,426
Patented July 6, 1971

3,591,426
CORROSION RESISTANT BERYLLIUM
Patricia M. O'Donnell, North Olmsted, Ohio, assignor to the United States of America as represented by the Administrator of the National Aeronautics and Space Administration
No Drawing. Filed Oct. 30, 1968, Ser. No. 772,006
Int. Cl. C23f *1/00*
U.S. Cl. 148—6.3         5 Claims

ABSTRACT OF THE DISCLOSURE

Oxidation of beryllium is prevented by a fluoride coating on the surface.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention is concerned with the prevention of oxidation of beryllium. The invention is particularly directed to inhibiting breakaway oxidation of beryllium.

Beryllium metal is a desirable material where lightness in weight, high temperature strength, thermal conductivity, or a neutron moderating capability is an important characteristic. Beryllium has been considered for use in nuclear reactors, advanced aircraft, and space applications, such as satellites.

Beryllium is a desirable substitute for aluminum where weight is of paramount importance. However, stress corrosion cracking of beryllium precludes this substitution in many applications.

Beryllium forms a protective oxide film on its surface. This protective oxide film is effective only at temperatures up to about 650° C.

When beryllium is heated above 650° C. it corrodes rapidly and then passivates. After a period of passivation breakaway oxidation is encountered wherein the oxidation rate accelerates very rapidly. This breakaway oxidation can lead to catastrophic failure. Both the film thickness at which breakaway oxidation occurs and the time to breakaway decrease as the temperature increases.

Beryllium is also sensitive to halide concentration. This makes beryllium unsuitable for use in tap water. Certain controls are necessary with water-cooled reactors using beryllium reflectors.

Various types of coatings have been suggested for beryllium to make this metal more useful. But they are deficient in that they are ineffective against both breakaway oxidation at elevated temperatures and stress corrosion cracking. Also, some of the coatings have a high solubility in water.

SUMMARY OF THE INVENTION

These problems have been solved by the present invention wherein beryllium is heated and then reacted with fluorine. This coats the surface with a beryllium fluoride film of the insoluble rhombic tridymite form.

OBJECTS OF THE INVENTION

It is, therefore, an object of the present invention to provide a corrosion resistant coating on beryllium that is insoluble in water.

Another object of the invention is to provide a method for coating beryllium to make it resistant to breakaway oxidation and stress corrosion cracking.

A still further object of the invention is to provide a protective film for beryllium that is effective in tap water.

These and other objects of the invention will be apparent from the specification which follows.

PREFERRED EMBODIMENT OF THE INVENTION

According to the present invention the beryllium is cleaned in preparation for the coating. This is accomplished by first dipping the beryllium in a HF-nitric acid solution. The surface of the beryllium is then washed with a detergent.

The cleaned beryllium is then heated to an elevated temperature for coating. This temperature is above 525° C. to produce the proper crystal structure in the coating.

The heated beryllium is then exposed to fluorine gas. Upon exposure to the fluorine the beryllium reacts forming a beryllium fluoride film. The beryllium is maintained at the elevated temperature during the reaction to insure the resulting beryllium fluoride film has a rhombic tridymite form. This film is insoluble in water and is glassy in appearance. The film thickness is preferably about 2,000 angstroms.

Beryllium strips were treated with fluorine in accordance with the present invention. These strips were heated to a temperature of 625° C. at 200 torr. Upon exposure to fluorine gas a beryllium fluoride film was formed on the strips. Certain of the strips had a film 2,00 angstroms thick while other strips had a film 12,000 angstroms thick. The thicker films resulted from a longer time exposure to the fluorine. Control strips of beryllium were not fluorinated.

All of the strips were immersed in either distilled or tap water. The control pieces exhibited a heavy white coating which was identified as beryllium oxide. The fluorinated strips were attacked much less rapidly. In the distilled water the fluorinated strips were essentially unchanged for about 3000 hours. The fluorinated strips also showed less film build-up in the tap water.

The strips were immersed in flowing water having a high chloride ion concentration of about 150 p.p.m. for 1700 hours. A beryllium fluoride coating 2,000 angstroms thick was sufficient to retard corrosion. The thicker coatings of 12,000 angstroms offered poor corrosion resistance because of an inability to adhere to the beryllium.

While a preferred embodiment of the invention has been disclosed it will be appreciated that various modifications may be made without departing from the spirit of the invention or the scope of the subjoined claims.

What is claimed is:
1. A beryllium metal having a coating of beryllium fluoride with a thickness of approximately 2000 angstroms, said coating having a rhombic tridymite form.
2. A process of treating beryllium metal to increase the corrosion resistance thereof comprising the steps of
   cleaning the surface of the beryllium metals,
   heating the cleaned beryllium metal to a temperature above 525° C., and exposing the heated beryllium to fluoride gas to form a substantially insoluble beryllium fluoride film thereon.

3. The process of treating beryllium metal as claimed in claim 2 wherein the metal is cleaned in a HF-nitric acid solution.

4. The process as claimed in claim 3 including the step of washing the beryllium metal in a detergent prior to heating.

5. The process of treating beryllium as claimed in claim 2 wherein the beryllium metal is heated to a temperature of 625° C.

References Cited

UNITED STATES PATENTS

| | | | |
|---|---|---|---|
| 2,175,771 | 10/1939 | Giles | 148—6.14 |
| 3,247,297 | 4/1966 | Salesse et al. | 148—6.3X |

FOREIGN PATENTS

| | | | |
|---|---|---|---|
| 836,062 | 6/1960 | Great Britain | 148—6.14 |
| 843,054 | 8/1960 | Great Britain | 148—6.14 |

RALPH S. KENDALL, Primary Examiner

U.S. Cl. X.R.

148—31.5